Nov. 18, 1958  A. F. HABENICHT  2,860,936
PISTON ASSEMBLY
Filed July 12, 1957
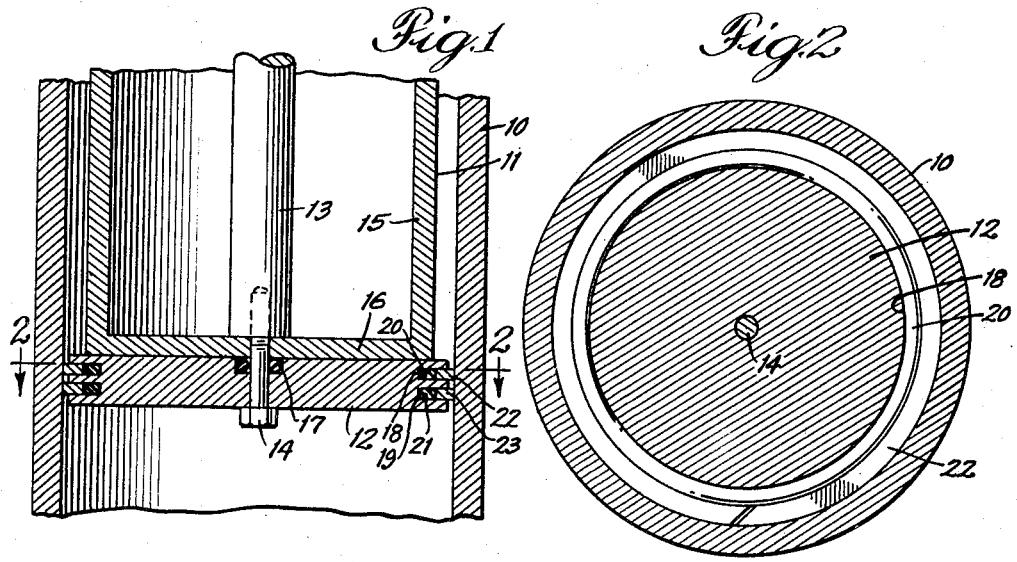
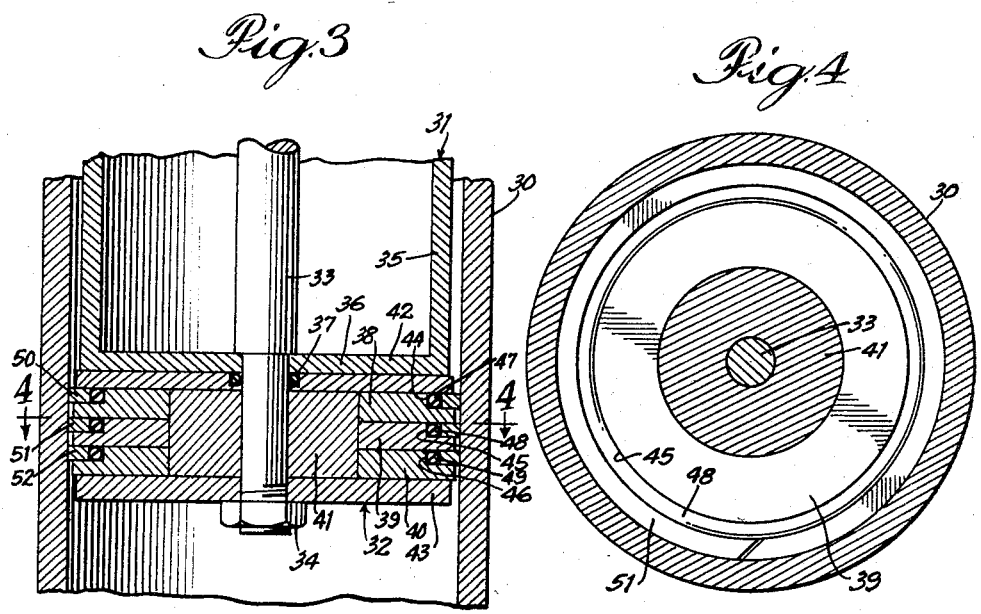
INVENTOR:
August P. Habenicht,
BY John W. Graham
ATTORNEY.

United States Patent Office

2,860,936
Patented Nov. 18, 1958

2,860,936

PISTON ASSEMBLY

August F. Habenicht, Tinley Park, Ill.

Application July 12, 1957, Serial No. 671,626

7 Claims. (Cl. 309—29)

This invention relates to a piston assembly, and more particularly to a piston structure equipped with rings to provide a sealing engagement with the walls of a cylinder. The invention is especially useful in connection with piston assemblies employed in hydraulic pumps as, for example, those used in the oil well industry.

In conventional piston-cylinder combinations, the piston is provided with sealing means in the form of rings that resiliently engage the walls of the cylinder to provide a seal therewith. Most frequently, leaf springs of various form are interposed beneath the rings to bias the same outwardly and against the cylinder walls. One of the difficulties encountered in such structures is that the rings, which are carried within circumferential channels provided by the piston, do not sealingly engage the surfaces that define such channels, and consequently there is a leakage of pressure thereabout. The leaf springs that also seat within such channels do not afford a seal, and in no way retard or interfere with such leakage of fluid pressure.

Further, in an effort to limit the pressure loss that occurs in this manner, it is usual to dimension the rings so that they are snugly received within the ring-receiving channels of the piston. However, though this arrangement does in a temporary sense restrict pressure loss, it is not at all satisfactory because the rings heat substantially during reciprocation of the piston, and therefore expand transversely whereupon they tend to bind within the channels with the result that the surfaces thereof in engagement with the cylinder wall, wear unevenly. Pressure loss then occurs between the rings and cylinder walls; and moreover, the rings then have a short life.

An object of this invention is to provide a piston assembly that overcomes the disadvantages enumerated above. Another object of the invention is that of providing a piston structure wherein the sealing rings may have a relatively loose fit with the ring-receiving channels therefor so that there is no interference with the free expansion and contraction and sealing function of the rings, but wherein means are provided for sealing the ring-receiving channels inwardly of the rings so that no loss of pressure can occur therethrough.

Still another object is in the provision of a piston structure having one or more ring-receiving channels thereabout, each having a piston ring mounted therein; and in which a resilient, compressible seal in the form of a rubber O-ring is mounted within each channel beneath the ring thereof, and functions to bias the ring outwardly and into resilient engagement with the walls of a cylinder and also to seal the ring-receiving channel so as to afford a barrier against the escape of pressure fluid therethrough.

Yet a further object is in the provision of a structure having the characteristics described, and wherein the piston comprises a compound structure having a plurality of piston segments mounted in contiguous, coaxial relation—at least some of which have a ring-receiving channel therein open along one side and closed therealong by the adjacent segment contiguous therewith. Yet a further object is to provide a segmental piston as described, wherein the ring-carrying segments are themselves of ring-shape and are filled centrally by a plug or filler member which may be of a material different from that of the segments themselves, whereby the material from which the segments are formed can be selected to provide the best performance with the particular cylinder and fluid with which it is used—such segmented piston permitting the use of continuous sealing rings (that is, rings that are not split as is usually necessary to permit the mounting thereof). Additional objects and advantages will become apparent as the specification develops.

Embodiments of the invention are illustrated in the accompanying drawing, in which—

Figure 1 is a broken vertical sectional view of a piston-cylinder combination embodying the invention; Figure 2 is a transverse sectional view taken along the line 2—2 of Figure 1; Figure 3 is a broken vertical sectional view showing a modified form of piston structure; and Figure 4 is a transverse sectional view taken along the line 4—4 of Figure 3.

The structure shown in Figures 1 and 2 comprises a cylinder 10 having a piston assembly 11 mounted for reciprocation therein. The piston assembly 11 in the form shown, has a piston proper or piston head 12 secured to a rod 13 by a cap screw 14 having the threaded end thereof received within a tapped bore provided therefor in the rod 13. Preferably, a sleeve 15 is included as part of the piston assembly and, as is apparent from the illustration, the sleeve is coaxial with the rod 13 and cylinder 10. To provide a means for securing the sleeve in place, a backing plate 16 which may be an integral part of the sleeve 15 or a separate member welded or otherwise rigidly secured thereto, extends along the upper surface of the piston head 12 and is held thereagainst by the cap screw 14. Preferably, a seal such as a rubber O-ring 17 surrounds the shank of the cap screw 14 along the mating surfaces of the backing plate and piston head 12 so as to prevent the escape of fluid along the shank of the cap screw.

The form of piston and cylinder combination shown is adapted to be used in a hydraulic pump, and in such instance the rod 13 will be operatively connected with a work member (not shown), which may be the walking beam of oil well equipment for example. The piston assembly 11 is reciprocated upwardly by the admission of fluid under pressure beneath the piston head 12, and the return stroke of the piston may be effectuated either by gravity or by a separate piston and cylinder combination reversely connected with the same work member. The sleeve 15 is included so as to minimize the volume of air or other fluid contained within the cylinder 10 above the piston head 12 when the piston assembly is reciprocated upwardly. That is to say, the volume of fluid effectively displaced by upward reciprocation of the piston assembly is that contained above the piston head 12 between the spaced, coaxial walls of the cylinder 10 and sleeve 15.

It is necessary to effectuate a sealing relation between the piston head 12 and cylinder 10 so that substantially no loss of pressure occurs therebetween. This is accomplished by providing the piston head 12 with a plurality of circumferential channels, and in the illustration there are two in number which are designated, respectively, with the numerals 18 and 19. Mounted within each of these channels is a seal member denoted, respectively, with the numerals 20 and 21, and exteriorly of the seal members but still within the channels are rings 22 and 23. As is evident from the drawing, the outer surfaces of the rings engage the inner wall of the cylinder 10 and slide thereagainst, and to permit mounting of the rings they are of split character (as shown in Figure 2) whereby they can be expanded to draw them over the outer circumference of the piston head 12.

The pins rings 22 and 23 are for the most part conventional split rings, and may be formed of any suitable ring material. They are dimensioned transversely (that is, from top to bottom in the illustration of Figure 1) so as to provide a relatively free fit within the respective channels 18 and 19, and thereby afford maximum expansion thereof without the danger of binding or freezing within the channel. The rings may, for example, provide a clearance of .003 to .004 of an inch with the walls of the channels.

The seal members 20 and 21 have the properties of resilience and compressibility so that they provide a biasing force against the rings tending to urge them outwardly against the inner wall of the cylinder 10, but at the same time are compressed by the rings so as to seal thereagainst and also against the surrounding walls of the channels. Since such seal members then substantially fill the entire cavity of each channel behind or inwardly of the respective rings, and in any event sealingly engage the various surfaces thereabout, there can be no escape of pressure across the piston head 12 by leakage around the rings. Ring members which have been found effective are rubber O-rings that may be made of Neoprene, and the dimensions thereof may be such that the rings are squeezed or compressed about .005 of an inch by the surrounding rings.

The modified structure shown in Figures 3 and 4 comprises a cylinder 30, having a piston assembly 31 reciprocable therein which includes a piston head 32 secured to a piston rod 33 by a cap screw or by means of a nut 34 threadedly received on a reduced end portion of the piston rod. A coaxial sleeve 35 is provided along with a backing plate 36, and a seal or rubber O-ring 37 surrounds the reduced end portion of the piston rod 33 to prevent the escape of fluid.

The piston head 32 differs from the piston head 12 heretofore described and is of segmental construction, comprising a plurality of ring-shaped piston segments 38, 39 and 40 which are mounted in contiguous relation and are coaxial with the rod 33. The central hollow portion of the piston segments is occupied by a filler or plug member 41 that is dimensioned so as to be snugly received within the segments and thereby prevent lateral or radial shifting thereof. The piston segments are held in rigid contiguous relation by enlarged washers or clamp plates 42 and 43, which may be of slightly smaller diameter than the segments 38 through 40. The plate 43 is drawn toward the plate 42 to effect such clamping of the piston segments therebetween when the nut 34 is tightened upon the reduced end of the piston rod.

Each of the piston segments is provided along the upper surface thereof with an annular ring-receiving channel, and the channels are identified respectively with the numerals 44, 45 and 46. It is apparent that the channels are open along the upper side thereof and are closed by the undersurface of the adjacent piston segment; and in the case of the piston segment 38, by the adjacent surface of the washer or clamp plate 42. Mounted within the channels are seal members 47, 48 and 49 and also the piston rings 50, 51 and 52. The piston rings may be split rings, as was the case of the rings 22 and 23 of the structure shown in Figures 1 and 2, but preferably are endless rings as shown in Figure 4.

The piston rings along the outer surface thereof sealingly engage the inner surface of the cylinder 30, and the seal members provide a sealing relation with the surrounding surfaces engaged thereby. Since both the rings and the seal members and also the respective ring-receiving channels have the same functions and interrelations as those described hereinbefore in connection with the embodiment of Figures 1 and 2, no further description thereof will be incorporated.

The piston head 32 is assembled by first placing the washer or plate 42 in position upon the reduced end of the rod 33 (as shown in Figure 3), the plug 41 is then placed in position and the successive piston segments 38 through 40 are mounted as shown, with the respective O-ring seals and piston rings in place. The clamp plate 43 is then added and the nut 34 tightened to rigidly lock the segments together and to secure the piston head to the piston rod. Since the various ring-receiving channels are open along one side thereof, it is unnecessary that the piston rings be split for they do not have to be expanded to mount the same within the channels, for they do not have to be drawn over the greatest perimetric dimension of the piston segments. The piston segments may be made from metal that is dissimilar from that used for the clamp plates 42 and 43 and for the filler plug 41, if such is desired; and should this be desirable, the metal may be selected so as to best accommodate the character of the fluid employed for the actuating force and also the metal employed in the cylinder 30.

The structure shown in both embodiments of the invention may operate to apply a mechanical force and movement through the piston rods to an external work element upon upward reciprocation of the piston assembly which is effected by the admission of fluid under pressure to the lower end of the cylinders to exert an upwardly directed pressure force against the lower surfaces of the piston heads. The piston rings sealingly engage the inner surface of the respective cylinders, and have an outwardly directed force imparted thereto by the resilient character of the seals. At the same time, the seals completely fill the channels inwardly of the rings and in sealingly engaging the surrounding surfaces, prevent the leakage of pressure therethrough.

While in the foregoing specification embodiments of the invention have been described in considerable detail for purposes of illustration, it will be apparent to those skilled in the art that numerous changes may be made in those details without departing from the spirit and principles of the invention.

I claim:

1. In a piston-cylinder structure, a cylinder, a piston assembly reciprocable therein and comprising a relatively narrow piston rod and a sleeve coaxially surrounding said rod so as to occupy a substantial volume of said cylinder and thereby decrease the effective volume thereof along said piston rod, said piston assembly comprising also a piston head secured to said rod and sleeve and having a plurality of spaced channels extending circumferentially thereabout, a piston ring mounted within each of said channels and extending outwardly therefrom for sealingly engaging the walls of said cylinder, and a resilient compressible seal member in the form of an endless ring mounted within each of said channels interiorly of the piston ring for sealingly engaging the surrounding surfaces to prevent the escape of pressure around each of said rings and through the respective channels.

2. The structure of claim 1 in which each of said seal members is maintained under continuous compression by the ring therefor, and in which each of said rings defines a clearance with the adjacent walls of the channels therefor in the order of about 0.003 to 0.004 of an inch.

3. The structure of claim 1 in which said piston head comprises a plurality of piston segments arranged in contiguous coaxial relation, each of said segments being of planar configuration and having an annular recess formed in a face thereof defining one of the aforesaid channels, said channels being closed on one side thereof by the segment contiguous therewith, and in which means are provided for rigidly securing said piston segments in such contiguous coaxial relation.

4. The structure of claim 3 in which said rings are endless.

5. The structure of claim 3 in which said piston segments are provided with enlarged central openings therethrough, and in which a filler plug is mounted within such openings and secured to said piston rod to effect the aforesaid constraint of the piston segments against radial displacement.

6. In a piston-cylinder combination, a cylinder, a piston assembly reciprocable therein, a piston head provided by said piston assembly and comprising a plurality of ring-shaped piston segments stacked one upon the other in contiguous coaxial relation, a pair of clamp plates coaxially disposed respectively along opposite sides of said stack, a filler plug disposed between said plates and within the central opening through said ring-shaped piston segments, means for drawing said clamp plates toward each other to rigidly constrain said piston segments in contiguous relation, each of said piston segments having a circumferential channel extending thereabout open along one transverse side thereof whereby said channels are effectively closed along such side by the adjacent piston segment and in one instance by the adjacent clamp plate, a resilient compressible seal member mounted within each of said channels, and a piston ring mounted within each of said channels externally of said seal member for sealingly engaging the walls of said cylinder, said seal members being effective to sealingly engage the adjacent surrounding walls to prevent the escape of pressure past said piston rings and through said channels.

7. The structure of claim 6 in which said piston assembly comprises also a piston rod and a surrounding sleeve coaxial therewith, and in which said means for drawing said clamp plates toward each other comprises means for securing said piston head to said piston rod.

References Cited in the file of this patent

UNITED STATES PATENTS

| | | |
|---|---|---|
| 2,509,672 | Christensen | May 30, 1950 |
| 2,607,644 | Smith et al. | Aug. 19, 1952 |
| 2,703,739 | Koplin | Mar. 8, 1955 |
| 2,729,388 | Ringham | Jan. 3, 1956 |